April 9, 1957 C. D. HOLTON 2,787,915
POWER TRANSMITTING CONNECTION
Filed Oct. 28, 1955
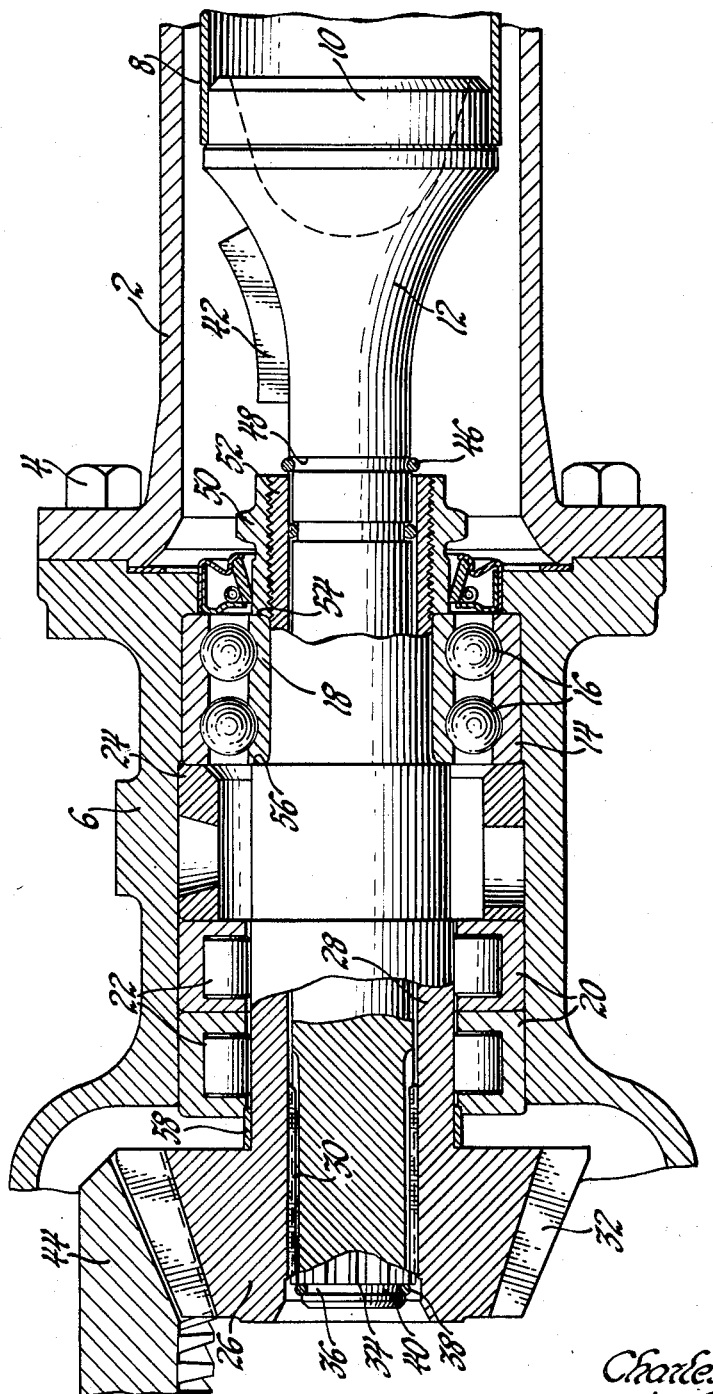
INVENTOR
Charles D. Holton
BY
J. C. Thorpe
ATTORNEY United States Patent Office 2,787,915
Patented Apr. 9, 1957

2,787,915

POWER TRANSMITTING CONNECTION

Charles D. Holton, Clio, Mich., assignor to General Motors Corporation, Detroit, Mich., a corporation of Delaware Application October 28, 1955, Serial No. 543,481

5 Claims. (Cl. 74—424)

This invention relates generally to power-transmitting mechanisms and particularly concerns a connection for transmitting power from the propeller shaft to the driving pinion in a vehicle drive.

The invention is particularly adapted to reduce loads applied to the pinion bearings by the propeller shaft under conditions of extreme torque tube deflection. This is accomplished by providing the pinion with a shaft splined so that the splines thereof lie in the same radial plane as the teeth of the pinion and by allowing a sufficient amount of freedom between the splines of the pinion and a set of splines provided on the end of a stub shaft fixed to and forming an extension of the propeller shaft.

For a further understanding of this invention and the objects thereof reference may be had to the accompanying drawing, in which:

The single figure is a sectional view of the novel power-transmitting connection.

Referring to the drawing, a torque tube is shown represented by the numeral 2. Torque tube 2 serves its usual function of transmitting thrust to the vehicle as well as being the reaction member for the torque of the propeller shaft and the torque of the rear wheels of the vehicle which tend to deflect the torque tube. The torque tube 2 is fixed at one end to the transmission housing (not shown) in a conventional manner and has its other end secured, as for example by the studs 4, to a supporting member 6 which is actually fixed to, so as to form, the differential and rear axle housing. Housed by the torque tube 2 is a hollow propeller shaft 8 whose one end is coupled to the transmission output shaft of the vehicle and whose opposite end receives a pilot end 10 formed on the end of a necked-down stub shaft 12. Mounted in the supporting member 6 is a dual ball bearing set including an outer race 14, ball bearings 16 and an inner race 18. Axially spaced from the ball bearing set are two roller bearing sets 20 adjacent each other which include roller bearings 22. Separating the roller bearing sets and the ball bearing sets in the supporting member 6 is a spacer 24. Journaled in ball and roller bearing sets which represent anti-friction means is a driving pinion which has appended thereto a hollow-tail shaft 28. The shaft 28 has stepped diameters forming shoulders so as to accommodate the different sizes and types of bearing sets in the supporting member 6. The pinion 26 is provided with internal splines 30 which lie in the same radial plane as the teeth 32 of the pinion. The stub shaft 12 extends through hollow shaft 28 and the pinion itself and is provided on an end 36 with cooperating splines 34 received between the internal splines 30 on the pinion 26. The fit between the stub shaft 12 and the hollow pinion is relatively loose so that a certain amount of freedom is provided between these two members. Retaining the pinion 26 axially in the stub shaft 12 is a snap ring 38 residing in a groove 40 and engaging the ends of the splines 30 on pinion 26. In order to improve the propeller shaft balance, balance weights 42 have been provided in the necked-down portion of the stub shaft 12 where they take up a minimum of room. The teeth of the pinion 32 mesh with the usual ring gear 44 of a conventional differential.

Also retaining the shaft of the pinion 26 on stub shaft 12 is a second snap ring 46 located in a groove 48 in the necked-down portion of shaft 12. The shaft 28 is also retained axially in the support 6 by a nut 50 threaded on the end 52 of shaft 28 which has an abutting shoulder 54 pressing the inner race 18 against a shoulder 56 on shaft 28 provided by one of the stepped diameters of shaft 28. Since the pinion 26 is prevented from being moved axially off the stub shaft 12 because of the snap ring 38 the roller bearing sets 22 are retained in the supporting member 6 by a small spacing bushing 58.

As previously mentioned, the torque tube 2 is quite often deflected substantially because of the fact that among other force factors it must take the reaction between the gear 44 and the pinion 26. As a result, the bearing sets in conventional and other types of drive assemblies, for example such as the ball and roller bearing sets shown, tend to become loaded by the propeller shaft. The proposed invention, however, by reason of the relatively loose fit between the splines 30 and 36 tends to relieve such stresses on the bearings and also permits the use of other types of pinion bearings, such as tapered roller bearings. By making the connection between the stub shaft 12 and the pinion 26 through the splines 30 and 36 in the same radial plane as the teeth 32 of the pinion 26 an even greater relief is provided for the bearings under conditions of extreme torque tube deflection.

From the foregoing it may be appreciated that a novel power-transmitting mechanism for transmitting power from a propeller shaft to a driving pinion has been provided which increases the flexibility of the connection to relieve loads otherwise applied to the bearings supporting the driving pinion. This is achieved primarily by the relatively loose fit between internal splines on the propeller shaft and the driving pinion and their location in the general plane of the teeth on the driving pinion. It will also be appreciated that better balancing of the propeller shaft is obtained in a simplified way by locating the balance weights in the necked-down portion of a novel necked-down stub shaft fixed to the end of a hollow propeller shaft.

What I claim is:

1. In a power-transmitting mechanism, a propeller shaft, a torque tube housing said shaft, a support to which an end of said tube is rigidly secured, a hollow driving pinion having a hollow shaft appended thereto, anti-friction bearings mounted in said support and supporting said hollow shaft, said pinion having internal splines, a stub shaft appended to said propeller shaft extending through said hollow shaft and said pinion and having splines engaging said internal splines, means supporting opposite ends of said propeller shaft and torque tube, said splines having freedom therebetween to prevent undue stress from being exerted on said bearings by said propeller shaft on extended deflection of said tube relative to said propeller shaft.

2. In combination with a power-transmitting mechanism a driving member, a torque tube forming housing about said driving member, a support to which an end of said housing is rigidly secured, a hollow-shafted driving pinion, bearing means mounted in said support and supporting said pinion, said pinion having internal splines, said driving member having splines engaging said internal splines, means supporting opposite ends of said driving member in said housing, said splines having radial freedom of movement therebetween to prevent undue stress from being exerted on said bearings by said driving member upon extended deflection of said housing relative to said driving member.

3. A power-transmitting mechanism comprising a hollow propeller shaft, a torque tube housing said shaft, a support to which an end of said tube is rigidly secured, a hollow driving pinion having a hollow shaft appended thereto, anti-friction bearings mounted in said support and supporting said hollow shaft for rotation therein, said pinion having internal splines, a stub shaft fixed to an end of said propeller shaft and necked down to extend through said hollow shaft and said pinion and having splines on the necked-down end thereof engaging said internal splines, means supporting opposite ends of said propeller shaft and torque tube, said splines having freedom therebetween to prevent undue stress from being exerted on said bearings by said propeller shaft on extended deflection of said tube relative to said propeller shaft.

4. A power-transmitting mechanism comprising a hollow propeller shaft, a torque tube housing said shaft, a support to which an end of said tube is rigidly secured, a hollow driving pinion having a hollow shaft appended thereto, anti-friction bearings mounted in said support and supporting said hollow shaft for rotation therein, said pinion having internal splines, a stub shaft fixed to an end of said propeller shaft and necked down to extend through said hollow shaft and said pinion and having splines on the necked-down end thereof engaging said internal splines, means supporting opposite ends of said propeller shaft and torque tube, said splines having freedom therebetween to prevent undue stress from being exerted on said bearings by said propeller shaft on extended deflection of said tube relative to said propeller shaft, and balance weights on said necked-down portion adjacent the end of said propeller shaft to which said stub shaft is fixed.

5. A power-transmitting mechanism comprising a hollow propeller shaft, a torque tube housing said shaft, a support to which an end of said tube is rigidly secured, a hollow driving pinion having a hollow shaft appended thereto, anti-friction bearings mounted in said support and supporting said hollow shaft for rotation therein, said pinion having internal splines, a stub shaft fixed to an end of said propeller shaft and necked down to extend through said hollow shaft and said pinion and having splines on the necked-down end thereof engaging said internal splines, means supporting opposite ends of said propeller shaft and torque tube, said splines having freedom therebetween to prevent undue stress from being exerted on said bearings by said propeller shaft on extended deflection of said tube relative to said propeller shaft, a groove on the splined end of said stub axle and a snap ring in said groove abutting said internal splines.

References Cited in the file of this patent
UNITED STATES PATENTS
1,142,621   Ravel _____ June 8, 1915